United States Patent [19]

Egee

[11] 3,944,119

[45] Mar. 16, 1976

[54] FEEDING AND MIXING APPARATUS

[75] Inventor: Walter Warren Egee, Wallingford, Pa.

[73] Assignee: Campbell Soup Company, Camden, N.J.

[22] Filed: Oct. 3, 1974

[21] Appl. No.: 511,807

[52] U.S. Cl. ................ 222/424; 222/464; 222/318; 259/36

[51] Int. Cl.$^2$ ........................................ G01F 11/28

[58] Field of Search ........... 222/318, 464, 195, 424; 239/142, 251; 259/36

[56] References Cited

UNITED STATES PATENTS

| | | | |
|---|---|---|---|
| 3,512,713 | 5/1970 | Carlyon, Jr. .................... | 239/142 X |
| 3,586,245 | 6/1971 | Carlyon, Jr. .................... | 239/251 X |
| 3,834,624 | 9/1974 | Novosad ......................... | 239/251 X |

*Primary Examiner*—Allen N. Knowles
*Attorney, Agent, or Firm*—John W. Logan, Jr.

[57] ABSTRACT

The preferred embodiment of the invention disclosed herein relates to a feeding and mixing arrangement for generally fluent material including components having different specific gravities, for example, certain food products, and includes a supply hopper in which the material is adapted to be contained. The supply hopper has an open upper end and has both discharge and inlet openings in its base. The discharge opening communicates through a supply conduit with an associated device, for example, a container filling apparatus, to which the fluent material is to be delivered and the inlet opening communicates with the supply conduit through a return conduit connected to the supply conduit adjacent the container filling apparatus. Rotatably mounted in the supply hopper is a first set of mixing tubes having one end in communication with the inlet opening and the other end in communication with the interior of the supply hopper and a second set of mixing tubes having one end in communication with the lower portion of the supply hopper and the other end in communication with a higher portion of the supply hopper. As the sets of mixing tubes are rotated or oscillated, they gently agitate the material in the supply hopper. The first set of mixing tubes recirculates some of the material being delivered through the supply conduit and the second set of mixing tubes recirculates the material within the supply hopper to maintain a homogeneous mixture.

16 Claims, 6 Drawing Figures

FEEDING AND MIXING APPARATUS

The invention disclosed herein relates to feeding and mixing apparatus for fluent materials and, more particularly, to feeding and mixing apparatus for fluent materials including separate components having different specific gravities.

When feeding fluent material including components having different specific gravities, it is usually desirable to maintain the material as a homogeneous mixture. If the fluent material is an end product being fed to a container filling apparatus filling the containers in which the product is to be sold, it is particularly desirable to maintain the mixture in a homogeneous condition so that each container is filled with generally the same proportion of each component resulting in a generally consistent product being delivered to consumers.

A most usual technique for feeding products of this type to filling apparatus involves the utilization of a mixing or stirring device in the supply hopper from which the product is fed for continually mixing, stirring or otherwise agitating the product in the hopper. While techniques of this type are generally satisfactory for certain products, it has been found that if the filling apparatus is temporarily shut down the heavier component of the product already in the supply line between the supply hopper and the filling apparatus will settle to the bottom of the supply line at the filling station forming part of the filling apparatus. Accordingly, when the filling apparatus is restarted the initial containers filled generally include more of the heavier component than usual resulting in, of course, an unsatisfactory product.

In addition to the problem noted above, certain additional problems have been encountered if the product is a food product such as soup including vegetables and/or meat chunks or a gravy including meat chunks. A most significant of these problems results from the fact that the vegetables and meat chunks should not be shredded or otherwise mutilated during either the filling operation or when being fed to the filling apparatus. Thus, in the food industry, utilization of the mixing or stirring devices noted above having sharp edges on that portion of the device actually immersed in the product has not been satisfactory because these sharp edges can shred or otherwise mutilate the vegetables and/or meat chunks. Additionally, some of these stirring devices are driven at such slow speeds to minimize the shredding problem that the agitation provided may not be satisfactory for maintaining a homogeneous mixture.

Accordingly, it is an object of this invention to provide a feeding and mixing apparatus for feeding fluent materials including components having different specific gravities that maintains the material as generally homogeneous mixture.

It is another object of this invention to provide a feeding and mixing apparatus for feeding fluent materials including components having different specific gravities that does not shred or otherwise mutilate the components thereof.

It is yet another object of this invention to provide a feeding system for feeding fluent materials having different specific gravities which system includes a mixing apparatus that both stirs the material and recirculates it to further assure a homogeneous mixture.

Finally, it is an object of this invention to provide a feeding and mixing apparatus particularly suited for use with soups, gravies and similar products having easily shredded or mutilated components and which is economically and easily constructed.

Briefly, these and other objects of this invention are accomplished by providing a feeding and mixing apparatus including a supply hopper adapted to contain a fluent material and formed with a discharge opening communicating with a supply conduit adapted to deliver the material to an associated apparatus and being further formed with an inlet opening forming part of a recirculation path between a portion of the supply conduit adjacent the associated device and the supply hopper. Rotatably mounted in the supply hopper is a first set of mixing tubes communicating with the inlet opening and the supply hopper and a second set of mixing tubes communicating with lower and upper portions of the supply hopper. Rotation of the mixing tubes about the longitudinal axis of the supply hopper stirs the material in the supply hopper and the first set of mixing tubes recirculates some of the material in the supply conduit back through the supply hopper while the second set of mixing tubes recirculates the material within the supply hopper.

Preferably the first set of mixing tubes includes a central hub rotatably mounted adjacent the inlet opening and which carries a pair of conduits having one end in communication with the inlet opening and another end in communication with the interior of the supply hopper. The second set of mixing tubes can conveniently include a pair of conduits rigidly carried on the hub and having both ends in communication with the interior of the supply hopper. All of the conduits or mixing tubes are arranged to extend upwardly and outwardly from the hub at an angle to the axis of rotation whereby a component of centrifugal force causes the material to flow upwardly through the conduits. By providing conventional conduits of circular cross-section, the portions immersed in the material being mixed will not shred or otherwise mutilate any easily degradable components thereof.

For a better understanding of the invention, reference is made to the following description of a preferred embodiment thereof taken in conjunction with the figures of the accompanying drawings, in which.

Figure 1:
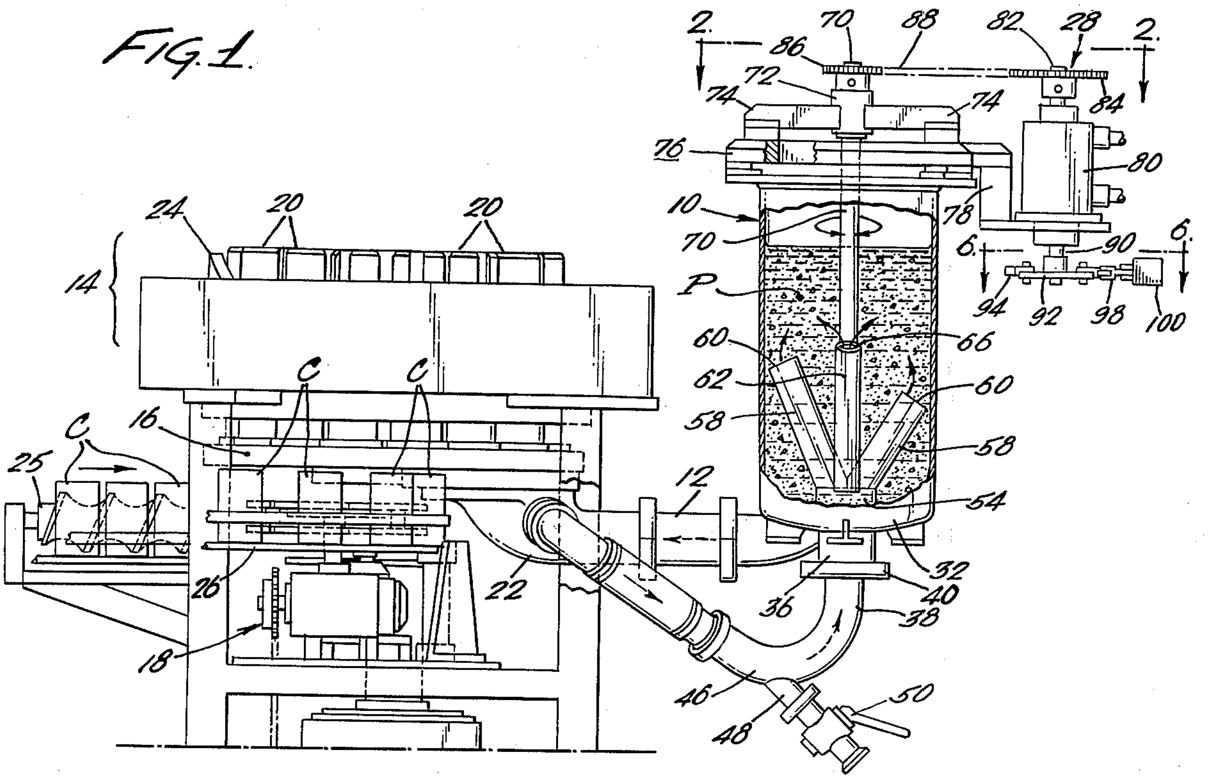
FIG. 1 is a front elevational view of a preferred embodiment of a feeding system in accordance with this invention.

Referring particularly to FIG. 1 of the drawing, there is illustrated a preferred embodiment of the invention particularly adapted to be utilized with food products including components having different specific gravities and which includes a supply hopper 10 in which the product P is contained and from which it is delivered through a supply conduit 12 to a container filling apparatus 14. Before proceeding, it should be understood that container filling apparatus 14 could be of any variety of suitable devices and that in the preferred embodiment of the invention disclosed herein is of the general type disclosed in U.S. Pat. No. 3,371,715 issued May 8, 1973 to Gageant et al and generally referred to as a "bottom filler." It should also be noted that the filler apparatus disclosed in the Gageant et al patent is a multi-stage filler apparatus, but for the sake of clarity only a single stage filler is illustrated herein. Container filling apparatus 14 includes a rotary table 16 driven by a suitable motor and drive arrangement shown generally at 18 and on which is carried a series of piston operated filling chambers 20. Product P to be dispensed into a container, the containers being generally illustrated at C, is delivered from supply hopper 10 through supply conduit 12 to a filling station which can be an enlarged portion of the conduit as indicated generally at 22. Rotary movement of table 16 locates filling chambers 20 over filling station 22 and as will be understood by reference to the Gageant et al patent, pistons associated with the filling chambers are driven upwardly allowing product P to flow into a filling chamber. Movement of the pistons is controlled by a cam track, a portion of which is shown at 24, so that a predetermined quantity of product is dispensed into a filling chamber 20. Continued rotary movement of table 16 will cause a filled chamber to move to a discharge position (not shown) located above a container moving at the same speed as the table, at which time the piston is caused to move downwardly by cam track 24 to discharge the product in the filling chamber into the container. Associated with container filling apparatus 14 is a conveyor 25 for feeding empty containers C thereto and a conveyor 26 for removing the filled containers.

Supply hopper 10 can be seen to be a generally cylindrical tank member having an open top on which is carried a drive assembly 28 the purpose of which will be made clear hereinafter and further having a discharge opening 30 formed in the bottom wall 32 thereof for communicating with conduit 12. Also formed in bottom wall 32 of supply hopper 10 is a centrally disposed inlet opening 34 having an axially extending sleeve 36 projecting therefrom. Sleeve 36 communicates with a recirculation conduit 38 having one end received in the sleeve and secured thereto by a retaining ring arrangement shown at 40 which includes a sealing arrangement 42. At the free end of conduit 38 extending inwardly of bottom wall 32 is located a suitable bearing member 44 in the form of a suitable thermoplastic collar and the purpose of which will be more fully explained hereinafter. As most clearly seen in FIG. 1 of the drawing, the conduit 38 communicates at its other end with supply conduit 12 adjacent the filling station 22 at the delivery end of the supply conduit. Thus, the conduit 38 provides a recirculation flow path between the delivery end of the supply conduit 12 and the inside of supply hopper 10. Still referring to FIG. 1, it can be seen that conduit 38 extends downwardly from conduit 12 to an elbow 46 from which it extends upwardly through collar 44. At elbow 46, conduit 38 communicates with a drain pipe 48 including a drain valve 50. Drain pipe 48 and drain valve 50 are utilized to drain the system for cleaning or other purposes.

Figure 3:
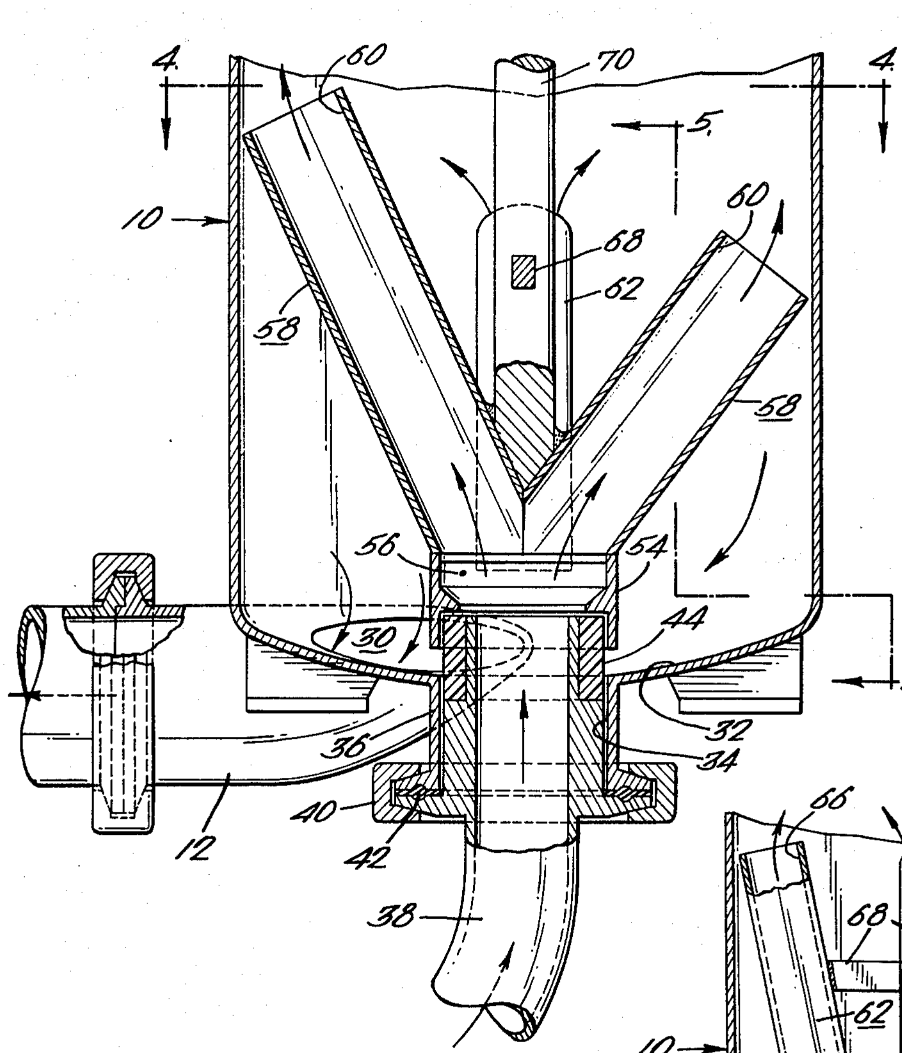
FIG. 3 is an enlarged sectional view of a portion of the supply hopper and mixer illustrated in FIG. 1.
Figure 4:
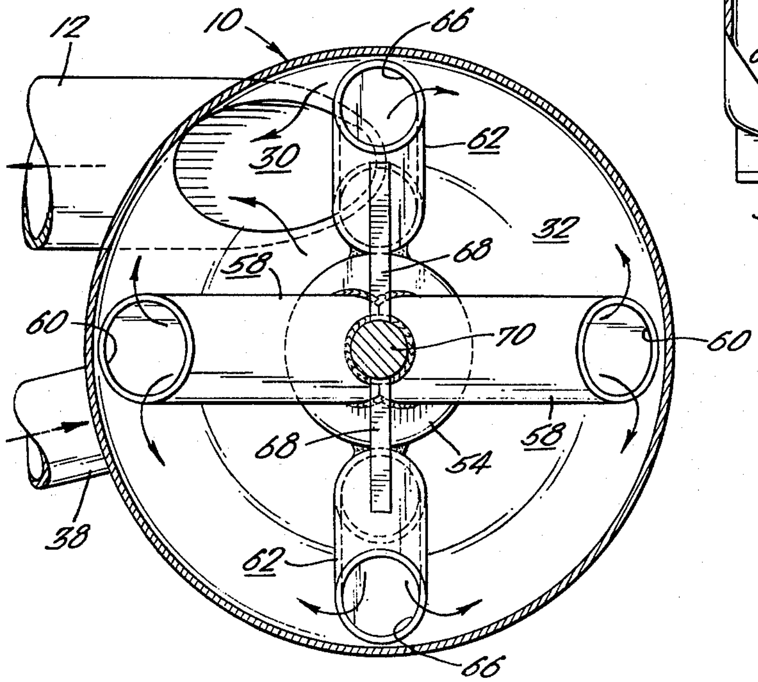
FIG. 4 is a sectional view of the supply hopper and mixer taken along the line 4—4 of FIG. 3.

Rotatably mounted in the supply hopper 10 is a stirring and mixing assembly including a central annular hub 54 seated on or surrounding the bearing member 44 for rotation thereon. As best seen in FIG. 3 of the drawing, the hub 54 defines a central flow chamber 56 from which extends a first set of mixing tubes including a pair of hollow open ended tubes 58, 58. While in the preferred embodiment of the invention, two such tubes are utilized, it should be understood that any number may be provided. The tubes 58, 58 each communicate at one end with flow chamber 56 and, thus, with conduit 38. In addition, at their other or free ends, each tube 58 includes a discharge opening 60 such that a recirculation flow path is established between the delivery end of supply conduit 12 and the interior of supply hopper 10. Each tube 58 extends upwardly and outwardly from hub 54 forming an angle with the axis of rotation of the hub. While the angle formed can vary it should be noted that for reasons to be fully understood hereafter, the tubes 58, 58 should not be oriented such that their longitudinal axis is parallel to the axis of rotation of hub 54.

Figure 5:
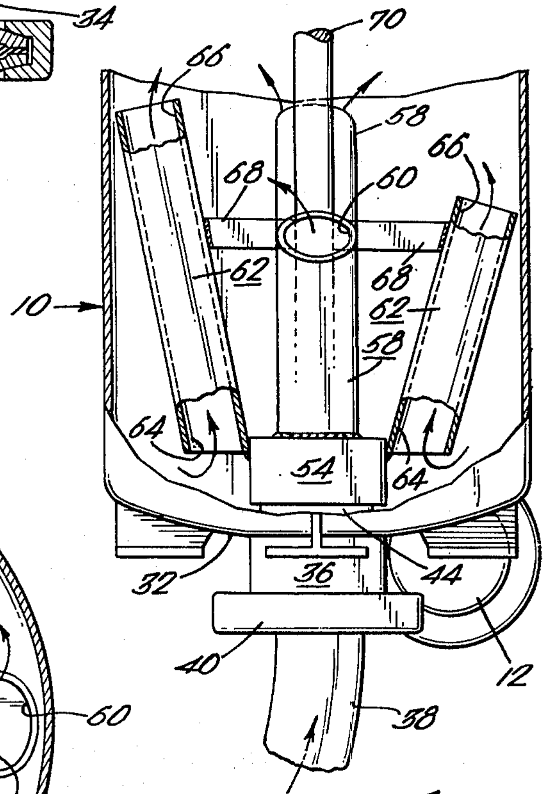
FIG. 5 is a partial sectional view of the supply hopper and mixer taken along the line 5—5 of FIG. 4; and, FIG. 6 is a plan view of a limit switch assembly usable with the preferred embodiment of the invention illustrated in FIG. 1 and taken along the line 6—6 thereof.

In addition, a second set of mixing tubes extends upwardly and outwardly from the outer surface of central hub 54. As best seen in FIG. 5 of the drawing, the second set of mixing tubes includes a pair of hollow open ended tubes 62, 62 each having an inlet opening 64 and a discharge opening 66. Adjacent the inlet opening 64, each tube 62 can be welded or otherwise secured to the outer surface of hub 54 so that the inlet opening communicates with an interior portion of supply hopper 10 adjacent the bottom wall 32. The tubes 62, 62 extend upwardly and outwardly from hub 54 forming an angle with the axis of rotation and discharge openings 66 communicate with another portion of the interior of supply hopper 10 axially and radially spaced from inlet openings 64. Thus, the tubes 62, 62 define recirculation paths within the supply hopper 10. Intermediate its inlet and discharge openings, 64 and 66 respectively, each tube 62 can be secured to a crossbrace member 68 secured to and radially extending from a drive shaft 70 extending upwardly from the intersection of the tubes 58, 58 and which, as will be explained hereinafter, cooperates with drive assembly 28 for rotating the two sets of mixing tubes. Before proceeding with the description of the preferred embodiment of the invention it is noted that similar to the tubes 58, 58, the tubes 62, 62 can form any of a variety of angles with hub 54 and, thus, their axis of rotation, but should not be oriented such that their longitudinal axis is parallel to the axis of rotation.

Figure 2:
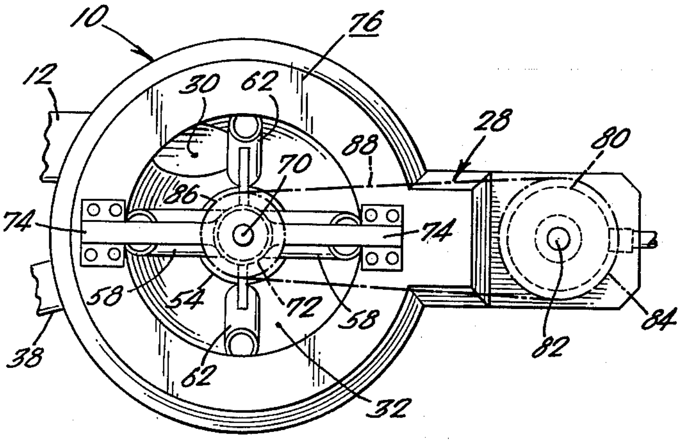
FIG. 2 is a top plan view of the supply hopper and mixer disclosed with the embodiment of the invention illustrated in FIG. 1 looking along the line 2—2 thereof.
Figure 6:
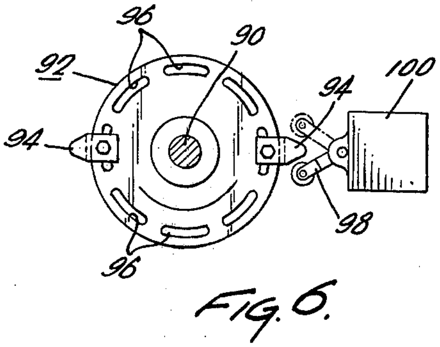

Proceeding now with a description of drive assembly 28, specific reference is made to FIGS. 1, 2 and 6 of the drawing. Drive shaft 70 projects above the top of supply hopper 10 and through a rotary bearing 72 on which are formed radially projecting arms 74, 74. At their free ends, arms 74, 74 are secured to an annular collar 76 which is removably seated on the top of supply hopper 10. Carried on the outer periphery of collar 76 is a generally L-shaped bracket 78 on which is carried a motor 80. It should be realized that motor 80 may be any suitable type and is preferably a hydraulic motor having a rotary output shaft 82 on which is fixedly carried a sprocket 84. Another sprocket 86 is fixed on the projecting end of drive shaft 70 and a chain 88 is engaged with both sprockets for transferring rotary output of motor 80 to the drive shaft for rotating the stirring and mixing assembly. It should be realized the output speed of motor 80 and drive shaft 70 can vary in accordance with the nature of the product P and in the case of a food product with which the preferred embodiment of the invention disclosed herein is particularly useful, only a gentle mixing or agitation of the product is desired. Accordingly, the rotation or oscillation of drive shaft 70 should be within a range of about 40 to 60 cycles per minute.

In certain applications depending on the nature of the fluent material with which the apparatus is used, it may be desirable to rotate drive shaft 70 and its associated mixing tubes and in certain other applications it may be desirable to oscillate the drive shaft and its associated mixing tubes. Accordingly, drive system 28 further includes a limit switch assembly for providing an oscillating output from motor 80 and thus for drive shaft 70. Motor 80 includes a second output shaft 90 on which is carried a disc 92 having trip arms 94 adjustably carried thereon. Trip arms 94 are removably and adjustably positioned in any of a series of arcuate slots 96 formed in the face of disc 92. As clearly shown in FIG. 6 of the drawing, trip arms 94 extend radially outwardly beyond the periphery of disc 92 so as to engage a pivoted switch arm 98 associated with switch 100 connected in a control circuit which reverses the output of motor 80. As shown in FIG. 6, trip arms 94 are located so that the switch arm 98 is provided to reverse the motor at the end of a corresponding output. By removing trip arms 94, motor 80 would provide a continuous rotary output.

Summarizing the operation of the preferred embodiment of the invention disclosed herein, supply hopper 10 is filled with food product P having components with different specific gravities to a level extending above discharge openings 60, 60 and 66, 66 of the mixing tubes 58, 58 and 62, 62, respectively. This level is preferably maintained. The food product is fed by gravity through discharge opening 30 in bottom wall 32 of supply hopper 10 and is delivered to the delivery end of supply conduit 12 adjacent filling apparatus 14. Some of the product will also flow through a recirculation path established by conduit 38, flow chamber 56 and mixing tubes 58, 58. When the motor 80 is activated, the drive shaft 70 will be rotated through sprockets 84 and 86 and chain 88. Rotation of drive shaft 70 will rotate the stirring and mixing assembly and the mixing tubes will stir the product in supply hopper 10. Since the mixing tubes form an angle with their axis of rotation, a component of centrifugal force will be applied to the product within the mixing tubes causing the product to be discharged into the interior of supply hopper 10 through the various discharge openings 60, 60 and 66, 66. Discharged product from tubes 58, 58 will be replaced from the delivery end of supply conduit 12 through conduit 38 and flow chamber 56. Thus product adjacent filling apparatus 14 is recirculated back to supply hopper 10. Discharged product from tubes 62, 62 will be replaced by product adjacent bottom wall 32 flowing into inlet opening 64, 64. Thus product within supply hopper 10 is recirculated.

It can be seen that the product is maintained throughout the feeding and filling cycle as a homogeneous mixture because of the stirring action provided by the mixing tubes 58, 58 and 62, 62 and because of the recirculation provided thereby. If the filling apparatus 14 is temporarily shut down, product at the delivery end of supply conduit 12 will be recirculated to assure that a homogeneous mixture is provided at filling station 22 when it is reactivated.

Finally, in the preferred embodiment of the invention disclosed herein, it can be seen that the mixing tubes 58, 58 are of a different length and that the mixing tubes 62, 62 are of a different length. With this arrangement discharge openings 60, 60 are axially spaced apart and discharge openings 66, 66 are also axially spaced apart. The recirculated product is thus discharged at varying axial locations in supply hopper 10 to provide a more consistent mixture.

In view of the foregoing description of a preferred embodiment of the invention it can be seen that a feeding and mixing apparatus has been provided which both stirs and recirculates a fluent material whereby the stirring can be done at relatively low speeds and still provide a homogeneous mixture. In addition it can be seen that by utilizing mixing tubes of circular cross-section, no sharp edges are immersed in the material which could shred or otherwise mutilate easily degradable components of the material.

While in the foregoing there has been disclosed a preferred embodiment of the invention, it should be obvious to one skilled in the art that various modifications may be made without departing from the scope of the invention as recited in the appended claims:

I claim:

1. A feeding and mixing apparatus for generally fluent material including components having different specific gravities, said apparatus comprising a supply hopper adapted to contain a supply of said material, said supply hopper including a discharge opening adjacent its lower end for communicating with a supply conduit adapted to deliver said material to an associated device and further including an inlet opening also adjacent its lower end and the discharge opening for communicating with the delivery end of said supply conduit, first and second mixing tube means rotatably mounted in said supply hopper, said first mixing tube means communicating with said inlet opening and with a portion of the interior of said supply hopper above the lower end whereby said first mixing tube means is operative to stir said material within said supply hopper and recirculate material between said delivery end of said supply conduit and said supply hopper, said second mixing tube means communicating with different interior portions of said supply hopper whereby said second mixing tube means is operative to stir and recirculate said material within said supply hopper.

2. A feeding and mixing apparatus in accordance with claim 1 wherein both said first and second mixing tube means extend at an angle to their axis of rotation whereby centrifugal force causes said material to flow therethrough.

3. A feeding and mixing apparatus in accordance with claim 1 wherein said first mixing tube means includes a plurality of tubes having one end in communication with said inlet opening and another end axially and radially spaced therefrom.

4. A feeding and mixing apparatus in accordance with claim 3 wherein each of said tubes has a different length.

5. A feeding and mixing apparatus in accordance with claim 1 wherein said second mixing tube means includes a plurality of tubes having an inlet opening located adjacent a first portion of said supply hopper and a discharge opening located adjacent another portion of said supply hopper.

6. A feeding and mixing apparatus in accordance with claim 5 wherein said first portion of said supply hopper is adjacent the bottom wall.

7. A feeding and mixing apparatus in accordance with claim 5 wherein each of said tubes has a different length.

8. A feeding and mixing apparatus in accordance with claim 1 including an annular hub rotatably mounted adjacent said inlet opening and forming a flow chamber in communication therewith.

9. A feeding and mixing apparatus in accordance with claim 8 wherein said first mixing tube means includes a plurality of tubes having one end in communication with said flow chamber and extending upwardly and outwardly therefrom.

10. A feeding and mixing apparatus in accordance with claim 8 wherein said second mixing tube means includes a plurality of tubes carried on the outer surface of said annular hub.

11. A feeding and mixing apparatus in accordance with claim 1 wherein said first and second mixing tube means are carried on drive shaft means and wherein said drive shaft means is driven by a motor.

12. A feeding and mixing apparatus in accordance with claim 11 wherein said motor is reversible and is associated with a limit switch wherein said driven shaft can be oscillated.

13. A feeding and mixing apparatus for fluent material having components with different specific gravities including a supply hopper adapted to contain a supply of said material, said supply hopper including a discharge opening communicating with a supply conduit for delivering said material to the delivery end of said conduit adapted to be located adjacent an associated device, said supply hopper further including an inlet opening communicating with one end of a recirculation conduit having its other end in communication with said delivery end of said supply conduit, an annular hub member rotatably mounted in said supply hopper adjacent said inlet opening and forming a flow chamber in communication with said recirculation conduit, a first plurality of mixing tubes having one end in communication with said flow chamber and extending upwardly and outwardly therefrom at an angle to the axis of rotation of said hub member and another end formed with a discharge opening radially and axially spaced from said flow chamber, a second plurality of mixing tubes rigidly connected to said first plurality of mixing tubes for rotation with said hub member, said second plurality of mixing tubes having one end in communication with one portion of said supply hopper and another end in communication with another portion of said supply hopper, and drive means for driving said hub member and said first and second plurality of mixing tubes whereby said tubes stir said mixture within said supply hopper and said first plurality of tubes recirculate some of said material between said delivery end of said supply conduit and said supply hopper and said second plurality of tubes recirculate said material in said supply hopper.

14. A feeding and mixing apparatus for generally fluent material including components having different specific gravities, said apparatus comprising a supply hopper adapted to contain a supply of said material, said supply hopper including a discharge opening for communicating with a supply conduit adapted to deliver said material to an associated device and an inlet opening for communicating with the delivery end of said supply conduit, first and second mixing tube means rotatably mounted in said supply hopper, said first mixing tube means communicating with said inlet opening and the interior of said supply hopper whereby said first mixing tube means is operative to stir said material within said supply hopper and recirculate material between said delivery end of said supply conduit and said supply hopper, said second mixing tube means communicating with different interior portions of said supply hopper whereby said second mixing tube means is operative to stir and recirculate said material within said supply hopper, said second mixing tube means including a plurality of tubes having an inlet opening located adjacent a first portion of said supply hopper and a discharge opening located adjacent another portion of said supply hopper, said first portion of said supply hopper being adjacent the bottom wall.

15. A feeding and mixing apparatus for generally fluent material including components having different specific gravities, said apparatus comprising a supply hopper adapted to contain a supply of said material, said supply hopper including a discharge opening for communicating with a supply conduit adapted to deliver said material to an associated device and an inlet opening for communicating with the delivery end of said supply conduit, first and second mixing tube means rotatably mounted in said supply hopper, said first mixing tube means communicating with said inlet opening and the interior of said supply hopper whereby said first mixing tube means is operative to stir said material within said supply hopper and recirculate material between said delivery end of said supply conduit and said supply hopper, said second mixing tube means communicating with different interior portions of said supply hopper whereby said second mixing tube means is operative to stir and recirculate said material within said supply hopper, an annular hub rotatably mounted adjacent said inlet opening and forming a flow chamber in communication therewith, said first mixing tube means, including a plurality of tubes having one end in communication with said flow chamber and extending upwardly and outwardly therefrom.

16. A feeding and mixing apparatus for generally fluent material including components having different specific gravities, said apparatus comprising a supply hopper adapted to contain a supply of said material, said supply hopper including a discharge opening for communicating with a supply conduit adapted to deliver said material to an associated device and an inlet opening for communicating with the delivery end of said supply conduit, first and second mixing tube means rotatably mounted in said supply hopper, said first mixing tube means communicating with said inlet opening and the interior of said supply hopper whereby said first mixing tube means is operative to stir said material within said supply hopper and recirculate material between said delivery end of said supply conduit and said supply hopper, said second mixing tube means communicating with different interior portions of said supply hopper whereby said second mixing tube means is operative to stir and recirculate said material within said supply hopper, said first and second mixing tube means being carried on drive shaft means, said drive shaft means being driven by a motor.

* * * * *